United States Patent
Higuchi

(10) Patent No.: US 6,492,935 B1
(45) Date of Patent: Dec. 10, 2002

(54) PERIPHERAL MONITORING SENSOR

(75) Inventor: Takashi Higuchi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 09/672,121

(22) Filed: Sep. 27, 2000

(30) Foreign Application Priority Data

Sep. 29, 1999 (JP) ............................................. 11-276930

(51) Int. Cl.$^7$ ............................................... G01S 13/93
(52) U.S. Cl. ............................... 342/70; 342/54; 342/71
(58) Field of Search ............................... 342/70, 71, 72, 342/52, 54, 55, 57, 58; 340/990, 384.3, 505, 825.19, 936; 701/119, 208, 213

(56) References Cited

U.S. PATENT DOCUMENTS

| | | | | |
|---|---|---|---|---|
| 3,898,652 A | * | 8/1975 | Rashid | 342/59 |
| 5,247,306 A | * | 9/1993 | Hardange et al. | 342/70 |
| 5,471,214 A | * | 11/1995 | Faibish et al. | 342/70 |
| 5,479,173 A | * | 12/1995 | Yoshioka et al. | 342/70 |
| 5,585,798 A | * | 12/1996 | Yoshioka et al. | 342/70 |
| 6,140,954 A | * | 10/2000 | Sugawara et al. | 342/70 |
| 6,246,357 B1 | * | 6/2001 | Uehara | 342/70 |

FOREIGN PATENT DOCUMENTS

| | | |
|---|---|---|
| JP | 5-342499 | 12/1993 |
| JP | 6-11570 | 1/1994 |
| JP | 6-124340 | 5/1994 |
| JP | 6-230115 | 8/1994 |
| JP | 6-293236 | 10/1994 |
| JP | 7-125567 | 5/1995 |
| JP | 7-320199 | 12/1995 |
| JP | 8-315299 | 11/1996 |
| JP | 8-329393 | 12/1996 |
| JP | 2000-501835 | 2/2000 |

OTHER PUBLICATIONS

"Obstacle detection algorithms with dealing with vagueness of sensing signals", Takahashi, H.; Fujimoto, K., Vehicle Electronic Conference, 2001. IVEC 2001. Proceedings of the IEEE International , vol., 2001, pp.: 163–168.*

"Automotive MM–wave Radar: Status And Trends in System Design And Technology", Wenger, J., Automotive Radar and Navigation Techniques (Ref. No. 1998/230), IEE Colloquium on, 1998, pp.: 1/1–1/7.*

"Automotive Radar And Related Traffic Applications Of Millimeterwaves", Meinel, H.H., Millimeter Waves, 1997 Topical Symposium on , 1997, pp.: 151–154.*

"Millimeter–wave backscatter measurements in suppoet of surface navigation applications", Snuttjer, B.R.J.; Narayanan, R.M., Geoscience and Remote Sensing Symposium, 1996. IGARSS '96, 'Remote Sensing for a Sustainable Future.', pp.: 506–508 vol. 1.*

* cited by examiner

Primary Examiner—John B. Sotomayor
(74) Attorney, Agent, or Firm—Christie, Parker & Hale, LLP

(57) ABSTRACT

For data detected by a milltimetric wave radar 2 and an image sensor 3, a signal processor 4 of a peripheral monitoring sensor 1 divides an area in which a detected target exists into a plurality of areas. For a target that exists within a certain specific area, information on the target is prepared based on the information obtained by both sensors. The millimetric wave radar is good at measuring a range and a speed of a target at long range. The image sensor is good at measuring a width and a bearing of a target. Therefore, by combining the data that each sensor is good at obtaining, it is possible to obtain accurate information. The signal processor 4 decides a surface of a target by combining an existing position of the target detected by the millimetric wave radar with target information detected by the image sensor. Thus, a peripheral monitoring sensor is obtained that securely senses a range, a relative speed, and a shape of the target.

16 Claims, 7 Drawing Sheets

| AREA | MILLIMETRIC WAVE RADAR | | IMAGE PROCESSING | |
|------|-------|-------|---------|-------|
|      | RANGE | SPEED | BEARING | RANGE |
| 11   | ○ | ○ |   |   |
| 12   | ○ | ○ | ○ | △ |
| 13   |   |   | ○ | △ |
| 14   | △ | △ | ○ | ○ |
| 15   |   |   | ○ | ○ |

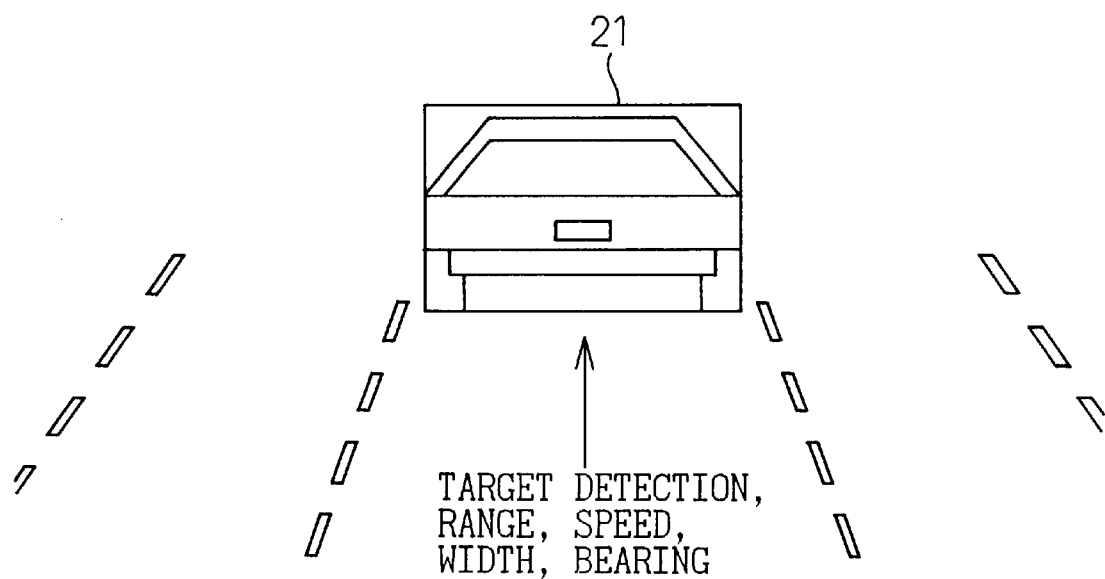

PERIPHERAL MONITORING SENSOR

BACKGROUND OF THE INVENTION

1. Field of the Invention

The present invention relates to a peripheral monitoring apparatus that is used in an automobile automatic run control system, for sensing a relative position, a relative speed and a shape of an object or a target.

2. Description of Related Art

In an automobile run control system as represented by an automatic cruise control system, a peripheral monitoring sensor must work as eyes for an automobile driver. Therefore, it is necessary that this apparatus securely senses a relative position of a target (a distance), a relative speed of the target and a shape of the target. So far, a peripheral monitoring sensor that is designed for an automobile has not been commercially available.

For an automatic cruise control system (ACC), there has conventionally been used a millimetric wave radar or an image sensor that employs a camera for recognizing a target that is in front, at the rear, or at the side of an automobile. The millimetric wave radar is good at measuring a distance from the automobile to a target. However, it is not good at recognizing a shape, that is, a size or width, of the target. On the other hand, the image sensor is not good at measuring a distance, but is good at recognizing a shape of a target.

As explained above, there has not so far been available a peripheral monitoring sensor that securely senses all of the relative position of a target, the relative speed of the target, and the shape of the target.

SUMMARY OF THE INVENTION

It is, therefore, an object of the present invention to provide a peripheral monitoring sensor that is capable of securely sensing the relative position of a target, the relative speed of the target, and the shape of the target.

In order to achieve the above object, according to one aspect of the present invention, there is provided a peripheral monitoring sensor that has a millimetric wave radar and an image sensor and their data is fused, for accurately detecting a relative position of a target, a relative speed of the target, and a shape of the target.

Further, according to another aspect of the invention, there is provided a peripheral monitoring sensor comprising a millimetric wave radar, an image sensor and signal processor, wherein the signal processor prepares information on a target existing within a predetermined area, based on information obtained from the millimetric wave radar and information obtained from the image sensor.

Further, according to still another aspect of the invention, there is provided a peripheral monitoring sensor having a fusion of a millimetric wave radar data that is good at detecting both a relative position and a relative speed of a target, and an image sensor data that is good at recognizing a shape of a target, thereby to provide correct peripheral information to a run control system as represented by an automatic cruise control system.

Further, according to still another aspect of the invention, there is provided a peripheral monitoring sensor of the above aspect, wherein the millimetric wave radar has a role of detecting an existence of a target such as a speed and a range to the target, and the signal processor combines information on the target such as a bearing and a width of the target obtained by the image sensor with a position of the target detected by the millimetric wave radar, thereby to judge the existence of the target.

BRIEF DESCRIPTION OF THE DRAWINGS

The above object and features of the present invention will become more apparent from the following description of preferred embodiments with reference to the following drawings.

FIG. 7 is a diagram showing an output of a fusion result in the processing shown in FIG. 3.

DETAILED DESCRIPTION OF THE PREFERRED EMBODIMENTS

Embodiments of the present invention will be explained below with reference to the drawings.

Figure 1:
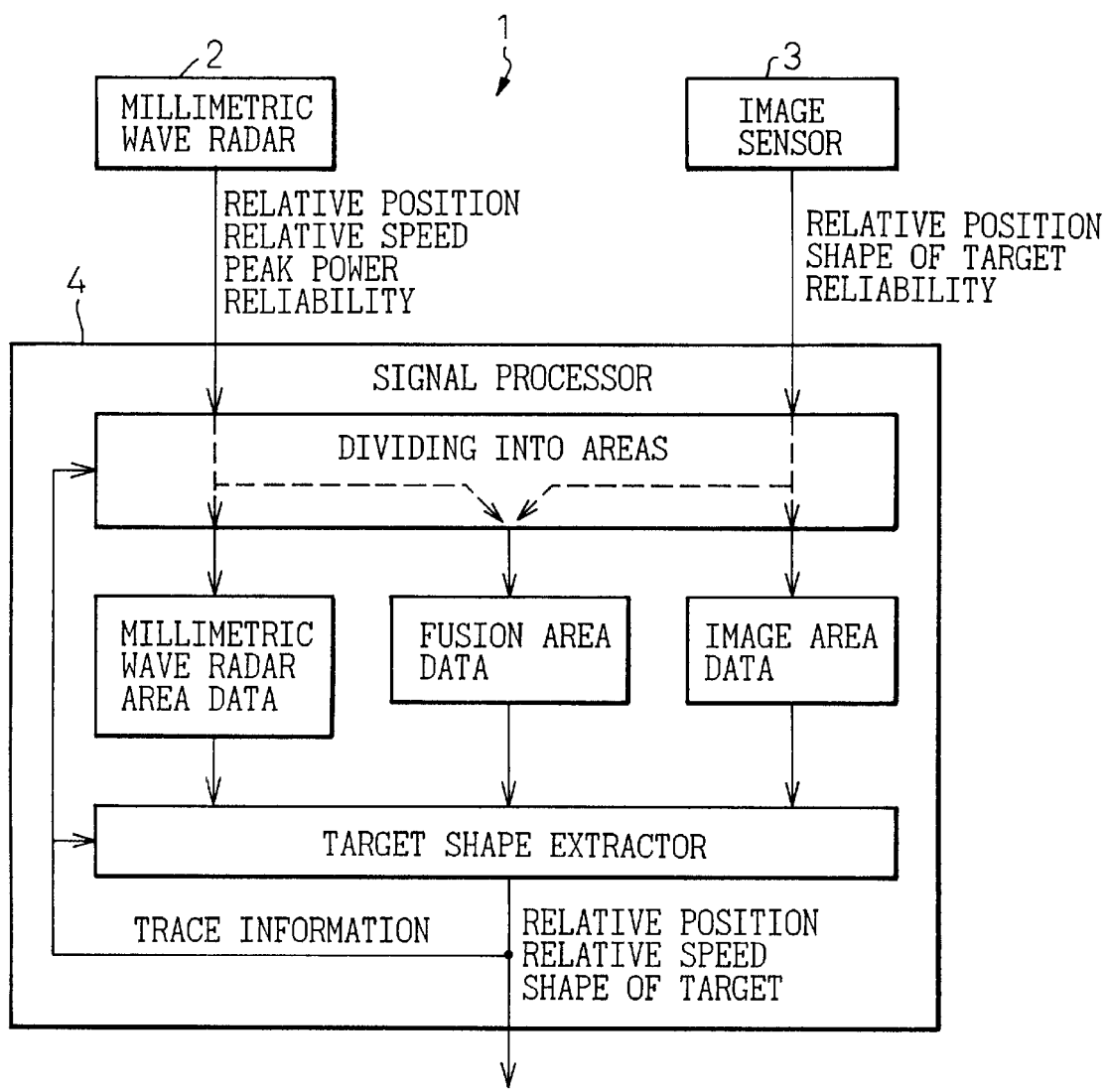
FIG. 1 is a diagram showing a configuration of a peripheral monitoring sensor to which the present invention is applied.

FIG. 1 is a diagram showing a configuration of a peripheral monitoring sensor to which the present invention is applied.

Referring to FIG. 1, a peripheral monitoring sensor 1 consists of a millimetric wave radar 2, an image sensor 3, and a signal processor 4.

The millimetric wave radar 2 transmits a millimetric wave beam to the front, receives a reflected wave, and obtains information on an object or a target from which the beam has been reflected.

The millimetric wave radar 2 has an advantage in that it is possible to measure with high precision a range and a speed of a target that exists at a relatively large distance from 10 m to 120 m, without influence of rain or fog. On the other hand, the millimetric wave radar 2 has a disadvantage in that it is not possible to accurately measure a bearing to a target, a width of a target, a range to a target and a speed of a target that exists at a distance of 10 m or at a shorter distance.

The millimetric wave radar detects a peak from a received millimetric wave signal and obtains, as data, a relative distance of the peak, a relative speed of the peak, a bearing of the peak, and power of the peak.

The image sensor 3 obtains an image in front of the vehicle by image pick-up means, and processes this image to detect information on the target in front of the vehicle.

The image sensor has an advantage in that it is possible to measure with high precision an angle and a width of a target. Further, it is also possible to adjust a measurement range to a broad range by exchanging a lens of the image pick-up means. On the other hand, the image sensor has a disadvantage in that it is influenced by rain or fog, and that a range measurement has a low precision.

The image sensor 3 detects edges in an image by image processing, and obtains as data a distance, a relative position and reliability.

The signal processor 4 consists of a CPU, a RAM and a ROM. FIG. 1 shows an outline function of the signal processor 4.

Figures 2A, 2B:
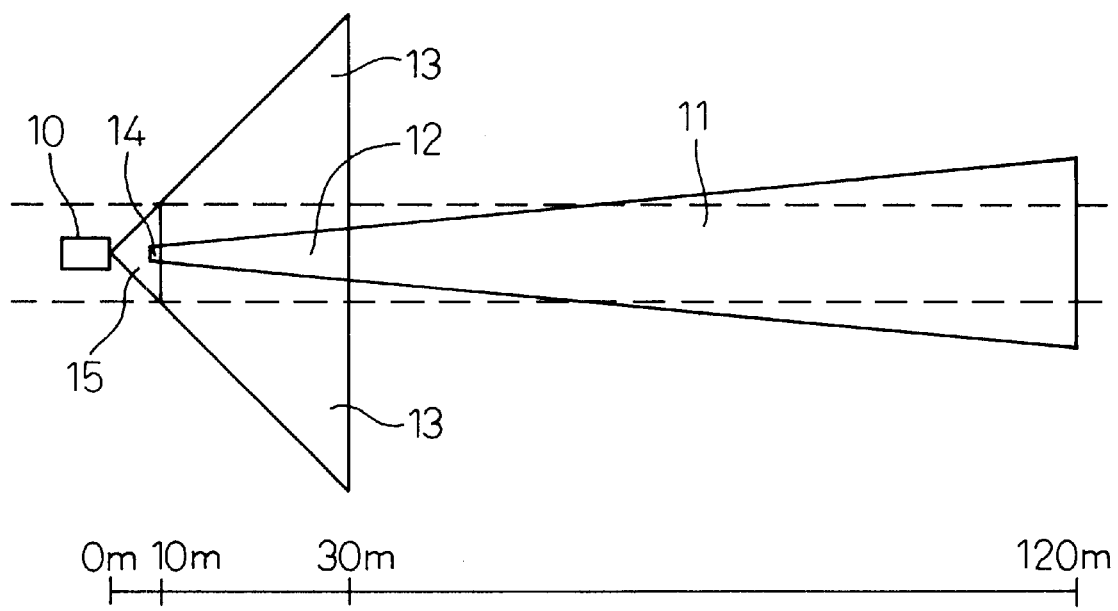
FIG. 2A is a diagram showing a detection area of the peripheral monitoring sensor shown in FIG. 1.
FIG. 2B is a table showing superiority levels of data of a millimetric wave radar and an image sensor.

Each data obtained from the millimetric wave radar 2 and the image sensor 3 is divided into data by area. The area will be explained with reference to FIG. 2A and FIG. 2B. FIG. 2A shows a measurement area of the millimetric wave radar 2 and the image sensor 3. FIG. 2B shows superiority levels of data of the millimetric wave radar and the image sensor for each area.

The millimetric wave radar 2 covers areas 11, 12 and 14 up to a range of about 120 m in a small width. The image sensor 3 covers areas 12, 13, 14 and 15 up to a range of about 30 m in a large width. The areas 12 and 14 are covered by both the millimetric wave radar 2 and the image sensor 3.

As shown in FIG. 2B, the millimetric wave radar 2 detects a range and a speed with high precision in the area 11 at a range from 30 to 120 m and the area 12 at a range from 10 and 30 m, respectively. However, the millimetric wave radar 2 detects a range and a speed in relatively lower precision in the area at a range shorter than 10 m. On the other hand, the image sensor 3 detects a bearing and a range with high precision at a range from 0 to 10 m. The image sensor 3 detects a bearing with high precision and a range with relatively lower precision at a range from 10 to 30 m. However, the image sensor 3 detects a bearing and a range with poor precision at a range greater than 30 m.

In the case of using the peripheral monitoring sensor 1 for the automatic cruise control of an automobile, the area can be divided into the following three parts. These are a control area that is necessary for the run control, a forecasting area that is necessary for forecasting the control, and a danger area in which the existence of a target itself is dangerous. In this case, the following target information is provided. Existence information is provided for a target in the forecasting area. A relative position, a relative speed, and a shape of a target are provided for a target in the control area. A digital signal that displays a danger is provided for a target in the danger area.

Therefore, the areas 11, 13 and 15 can be considered forecasting areas. The area 12 can be considered a control area, and the area 14 can be considered a danger area. The setting of the ranges of the forecasting area, the control area and the danger area is not limited to the one as shown in FIG. 2A. Each area is stored into a memory of the signal processor 4.

In the division of the areas shown in FIG. 1, the control area 12 and the danger area 14 can be handled as fusion areas where the data obtained from the millimetric wave radar 2 and the image sensor 3 are fused together. In this way, it is possible to obtain information on the target with high precision. The remaining forecasting areas 11, 13 and 15 are set as the areas in which the millimetric wave radar 2 and the image sensor 3 individually obtain information that shows an existence of a target, in a similar manner to that of the conventional sensor.

Referring to FIG. 1 again, the data obtained from the millimetric wave radar 2 and the image sensor 3 are divided into the data in the millimetric wave radar area, the data in the fusion area, and the data in the image sensor area respectively, according to the method of dividing the area as explained above.

From each data, target information including a relative position, a relative speed and a shape of a target is extracted corresponding to each target. The extracted target information is used for the automatic cruise control apparatus. These pieces of information are fed back to a target information extractor as trace information for continuously detecting the target.

Figure 3:
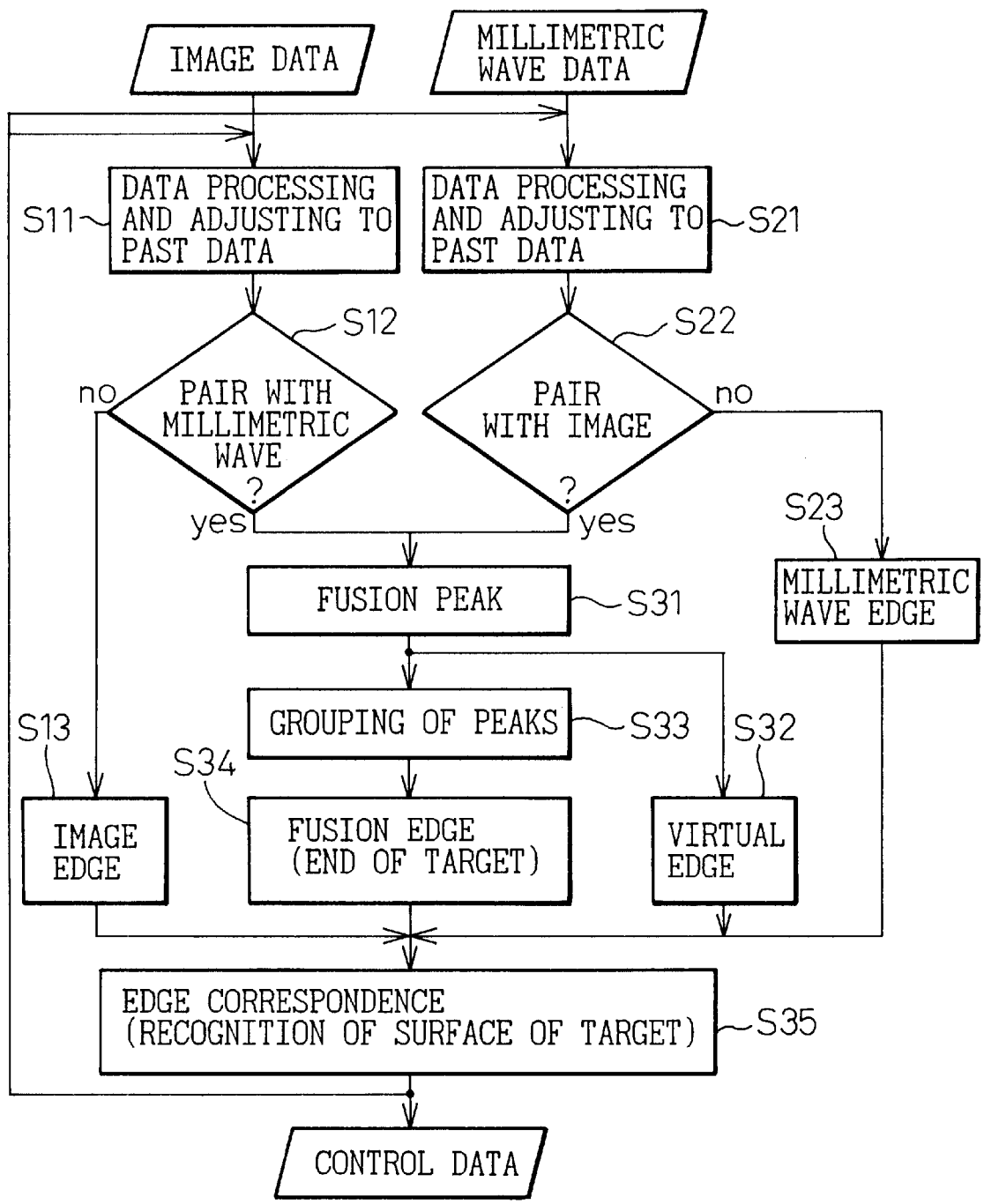
FIG. 3 is a flowchart showing an operation of the peripheral monitoring sensor shown in FIG. 1.

Processing in the signal processor 4 will be explained next with reference to a flowchart shown in FIG. 3.

The image data obtained from the image sensor 3 is processed and made to adjust to the past data at step S11. The data processing is carried out in a similar manner to that of the conventional image processing. The data adjusting to the past data is for complementing the data obtained this time with the information obtained by past data processing. The millimetric wave data obtained from the millimetric wave radar 2 is also similarly processed and complemented at step S21.

At step S12, a decision is made as to whether the image data is to be set as a pair with the millimetric wave data. At step S22, a decision is made as to whether the millimetric wave data is to be set as a pair with the image data. These decisions correspond to the area division processing shown in FIG. 1.

When a decision has been made at step S12 that the image data (the data detected in the forecasting areas 13 and 15) is not to be paired with the millimetric wave data, an image edge is extracted based on only the image data at step S13. When a decision has been made at step S22 that the millimetric wave data (the data detected in the forecasting area 11) is not to be paired with the image data, a millimetric wave edge is extracted based on only the millimetric wave data at step S23. When the image edge and the millimetric wave edge have been extracted, the process proceeds to step S35. Then, recognition of a surface of the target, to be described later, is carried out at step S35.

The data detected in the control area 12 and the danger area 14 are fused together, that is, the millimetric wave data and the image data are fused together, at step S31.

Figure 4:
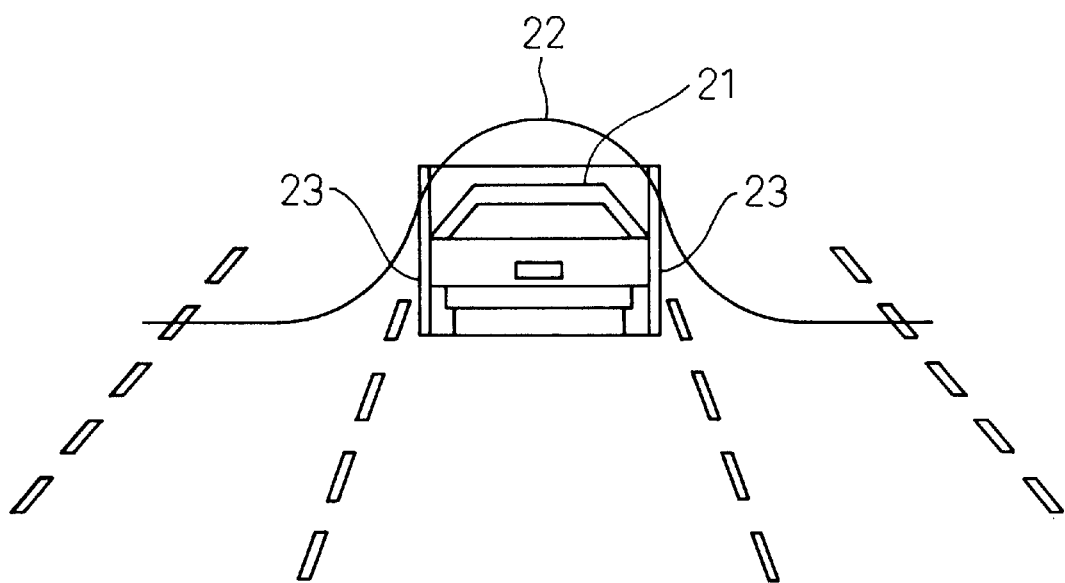
FIG. 4 is a diagram showing an image of a fusion processing in the processing shown in FIG. 3.

FIG. 4 shows an image of the fusion. When a target (a vehicle) 21 exists in front of the automobile, the millimetric wave radar 2 detects peak power 22, and the image sensor 3 detects an image edge 23. Based on a combination of the peak power 22 and the image edge 23, the existence of one target 21 is accurately detected. Then, the target information is obtained, using the information that the millimetric wave radar 2 and the image sensor 3 are good at, to obtain respectively as shown in FIG. 2B. In other words, for the target that exists in the control area 12, the millimetric wave data is used to obtain a range and a speed of this target, and the image data is used to obtain a bearing of this target. Further, for the target that exists in the danger area 14, the image data is used to obtain a bearing and a range of this target, and the millimetric wave data is used to obtain a speed of this target.

Referring to FIG. 3 again, peak power is obtained by fusion at step S31. When only one edge has been extracted as a result, a virtual edge corresponding to the extracted edge is prepared at step S32. Then, one set of millimetric wave edges is prepared from the extracted edge and the virtual edge.

When the number of edges extracted at step S31 are two or more, the peak powers of the millimetric wave data are grouped at step S33. The reliability of the grouped peak powers is checked at step S34. Then, a fusion edge (an edge of a target) is fixed based on the data of high reliability.

Figure 5A:
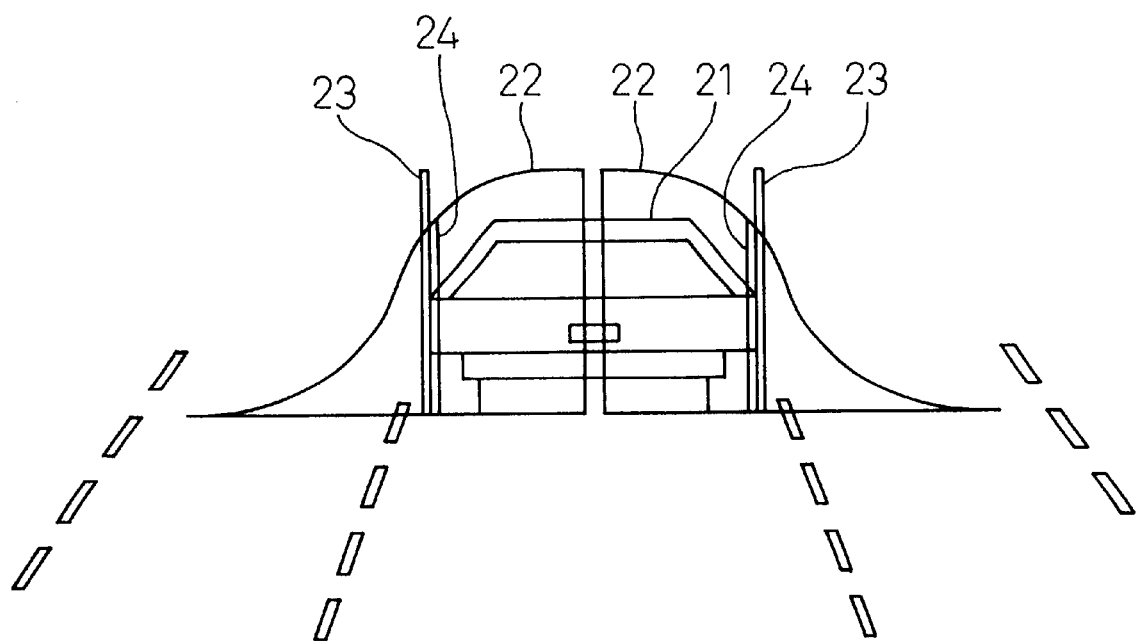
FIG. 5A is a diagram showing a fusion logic for detecting an edge of the target in the processing shown in FIG. 3.
Figure 5B:
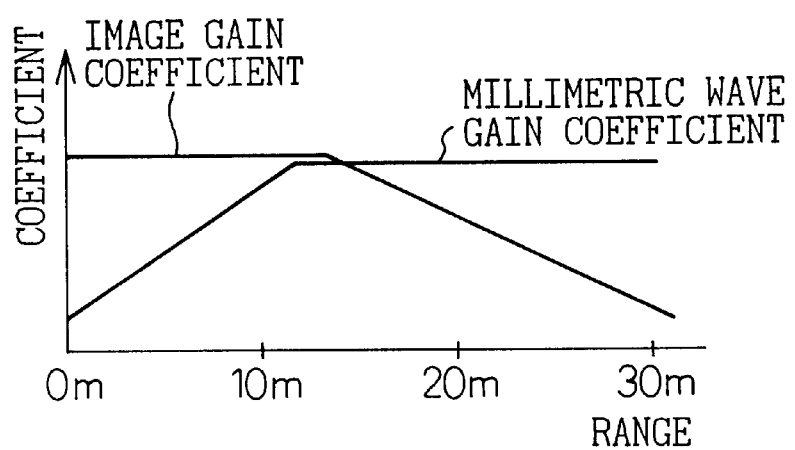
FIG. 5B is a diagram showing a millimetric wave gain coefficient and an image gain coefficient in the fusion logic shown in FIG. 5A.

FIG. 5A and FIG. 5B show a logic of the processing of grouping at step S33 and the fix-up processing of the fusion edge at step S34. In FIG. 5A, the image edge 23 is displayed at both sides of the target 21. Further, adjacent to the image edges at both sides of the target 21, the reliability 24 is displayed.

The peak powers are grouped. The grouping is carried out for each one edge. As a result, two grouped peak powers 22 and 22 are obtained for one target 21 as shown in FIG. 5A. Depending on the situation, three or more edges are detected for one target 21.

By integrating the respective peak power 22 of each group, the fusion power is obtained from the following expression.

Fusion power=millimetric wave gain coefficient×peak power integration value+image gain coefficient×edge reliability.

The millimetric wave gain coefficient and the image gain coefficient take different values, depending on the distance, as shown in FIG. 5B. The millimetric wave gain coefficient is 1 when a relative range is about 10 m or above, and is gradually lowered when a range becomes smaller than 10 m. The image gain coefficient is 1 when a range is about 15 m or below, and is gradually lowered when a range becomes larger than 15 m.

When the fusion power obtained from the above calculation is high, the image edge 23 is recognized as an end of the target. The image edge recognized here is firmed up as the fusion edge.

Referring to FIG. 3 again, a surface of the target is recognized by the edge correspondence at step S35. For recognizing the surface of the target, there are used the fusion edge (step S34), the virtual edge (step S32), the image edge (step S13), and the millimetric wave edge (step S23).

Figure 6A:
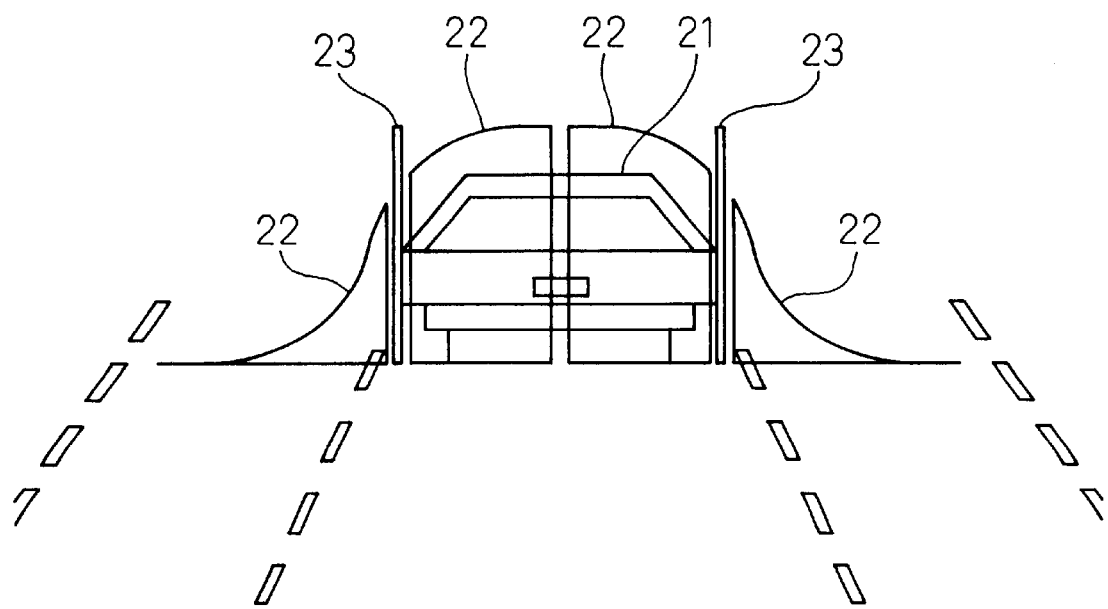
FIG. 6A is a diagram showing a fusion logic for recognizing a surface of a target in the processing shown in FIG. 3.

FIG. 6A shows fusion logic for recognizing a surface of a target in the fusion processing at step S35. The recognition of a surface of the target based on only the image edge and the recognition of a surface of the target based on only the millimetric wave edge (including a virtual edge) can be carried out by a method similar to that of the conventional peripheral monitoring sensor.

For recognizing a surface of the target based on the fusion logic, a decision is made as to at which side of the edge 23 the target exists. For this purpose, first, the correlation power between the edges is calculated based on the following expression. A surface of the target is recognized when the target 21 exists between edges of a high correlation power.

Correlation power millimetric wave gain coefficient× single-side peak power integration value+image gain coefficient×edge correlation reliability.

Figure 6B:
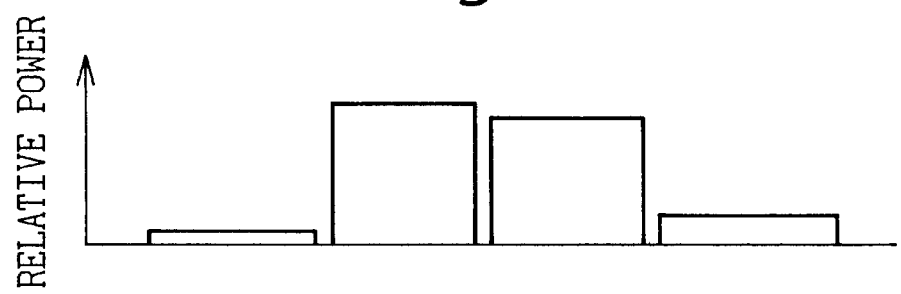
FIG. 6B is a diagram showing a correlation power of the fusion logic shown in FIG. 6A.

For the millimetric wave gain coefficient and the image gain coefficient, those shown in FIG. 5B are used. The single-side power integration value is a value obtained by integrating the both-side peak powers 22 with the image edge 23 as a center. As shown in FIG. 6B, when the target 21 exists, the correlation, power takes a higher value than when the target 21 does not exist. The edge correlation reliability is obtained by discriminating the target 21 based on the identification of the background color and the color of the target using the image data.

FIG. 7 shows an image of an output of a fusion result. By the fusion, the target 21 is detected, and the information including a range, a relative speed, a width, and a bearing, is firmed up. For firming up each piece of information, the data of higher reliability between the millimetric wave data and the image data is used as explained with reference to FIG. 2B. As a result, data of high precision can be obtained as the information on the target.

Referring to FIG. 3 again, at step S36, control data is prepared and output for each surface of the target recognized at step S35. This control data is used in the ECU for the automatic cruise supporting system, for example. When the target 21 has been detected in the danger area 14, an alarm signal of a digital value is output to an alarm unit not shown.

Various data obtained by the edge correspondence at step S35 are fed back to step S11 and step S21 respectively for adjusting the data to the past data. This past-data correspondence processing is carried out as follows. When the target 21 has shifted from the fusion area 12 or 14 (reference FIG. 2A) to another area, for example, the reliability of the data of either the millimetric wave radar 2 or the image sensor 3 is lowered temporarily. Further, the fusion data substitutes for the data that the millimetric wave radar 2 or the image sensor 3 is not good at. In this way, it is possible to trace the target securely. It is also possible to utilize this past-data adjusting processing in the processing of a target existing in the fusion areas 12 and 14 respectively.

As explained above, depending on the characteristics of the millimetric wave radar and the image sensor, the performance of the image sensor 3 is easily influenced by the environment like rain or fog. As a countermeasure against this performance deterioration, when a rainfall sensor has detected a rainfall that causes performance deterioration, for example, the data that is deteriorated is substituted by the data of other sensor. In this way, it is possible to obtain satisfactory data.

As explained above, according to the present invention, it is possible to obtain a peripheral monitoring sensor that can securely sense a range and a relative speed of a target, and a shape of the target.

What is claimed is:

1. A peripheral monitoring sensor comprising:
    a millimetric wave radar for detecting a position of a target object existing within a predetermined area;
    an image sensor for detecting a shape of the target object; and
    a signal processor for preparing information on the target object by combining information related to the target object obtained from the millimetric wave radar and information related to the target object obtained from the image sensor.

2. The peripheral monitoring sensor according to claim 1, wherein the millimetric wave radar includes means for detecting an existence of the target, and the signal processor includes means for combining information of an end of the target obtained by the image sensor with a position of the target detected by the millimetric wave radar to decide a surface of the target.

3. The peripheral monitoring sensor according to claim 2, wherein the signal processor includes means for detecting the end of the target by using a value obtained by integrating peak power near the end of the target detected by the millimetric wave radar.

4. A peripheral monitoring sensor comprising:
    a millimetric wave radar;
    an image sensor; and
    a signal processor having instructions for preparing information on a target existing within a predetermined area, by combining information related to the target obtained from the millimetric wave radar and information related to the target obtained from the image sensor, wherein the signal processor has a memory for storing a millimetric wave gain coefficient according to a range and an image gain coefficient according to a range, and the signal processor provides information on an edge of the target based on information obtained by multiplying reliability in the information of the millimetric wave radar with the millimetric wave gain coefficient and information obtained by multiplying reliability in the information of the image sensor with the image gain coefficient.

5. The peripheral monitoring sensor according to claim 3, wherein the signal processor includes means for checking existence detection information to detect whether a target exists at one or more of left edge of the target, right edge of the target, and edge of the end of the target.

6. The peripheral monitoring sensor according to claim 5, wherein the signal processor includes means for detecting the end of the target by using a value obtained by integrating peak power near the end of the target detected by the millimetric wave radar.

7. A peripheral monitoring sensor, comprising:
a millimetric wave radar;
an image sensor; and
a signal processor having instructions for preparing information on a target existing within a predetermined area, by combining information related to the target obtained from the millimetric wave radar and information related to the target obtained from the image sensor, wherein the signal processor has a memory for storing an area necessary for control and an area necessary for forecasting the control, and the signal processor includes means for providing a relative position, a relative speed, and a shape of a target for a target detected in the area necessary for the control, and means for providing existence information for a target detected in the forecasting area.

8. The peripheral monitoring sensor according to claim 7, wherein the signal processor includes a memory for storing a danger area in which the existence of a target is dangerous, and means for outputting a signal that shows the target is in the danger area.

9. The peripheral monitoring sensor according to claim 7, wherein the area necessary for the control is agreed with an area in which the area sensed by the millimetric wave radar and the area sensed by the image sensor are over-lapped with each other.

10. The peripheral monitoring sensor according to claim 9, wherein the signal processor has means for tracing a target that leaves from the area in which the area sensed by the millimetric wave radar and the area sensed by the image sensor are superimposed on each other.

11. The peripheral monitoring sensor according to claim 10, wherein the signal processor includes means for lowering the reliability of the data of the millimetric wave radar or the image sensor when the target is traced.

12. The peripheral monitoring sensor according to claim 11, wherein the signal processor includes means for lowering the reliability of the data of the millimetric wave radar or the image sensor when the target is traced for the area in which the area sensed by the millimetric wave radar and the area sensed by the image sensor are superimposed on each other.

13. A method for peripheral monitoring of a target object comprising:
receiving information from a millimetric wave radar related to distance of the target object;
receiving information from an image sensor related to a shape of the target object; and
combining the distance information and the shape information to determine a position, speed, and shape of the target object.

14. The method of claim 13 further comprising determining a surface of the target object by combining information of an end of the target detected by the image sensor with a position of the target detected by the millimetric wave radar.

15. The method of claim 13, wherein the end of the target is detected by using a value obtained by integrating peak power near the end of the target detected by the millimetric wave radar.

16. The method of claim 13 further comprising:
storing a millimetric wave gain coefficient according to a range and an image gain coefficient according to a range;
multiplying reliability in the information of the millimetric wave radar with the millimetric wave gain coefficient and information obtained by multiplying reliability in the information of the image sensor with the image gain coefficient; and
providing information on an edge of the target based on the multiplied information.

* * * * *

UNITED STATES PATENT AND TRADEMARK OFFICE
CERTIFICATE OF CORRECTION

PATENT NO.    : 6,492,935 B1
DATED         : December 10, 2002
INVENTOR(S)   : Takashi Higuchi It is certified that error appears in the above-identified patent and that said Letters Patent is hereby corrected as shown below:

<u>Title page,</u>
Item [57], ABSTRACT,
Line 1, replace "milltimetric" with -- millimetric --.

Signed and Sealed this

Nineteenth Day of October, 2004

JON W. DUDAS
*Director of the United States Patent and Trademark Office*